(12) United States Patent
Faucette et al.

(10) Patent No.: US 11,146,667 B2
(45) Date of Patent: Oct. 12, 2021

(54) CONFIGURABLE SEGMENTATION OFFLOAD

(71) Applicant: Cisco Technology, Inc., San Jose, CA (US)

(72) Inventors: Reese Faucette, Lincoln, CA (US); David Walker, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 16/685,104

(22) Filed: Nov. 15, 2019

(65) Prior Publication Data

US 2021/0152672 A1 May 20, 2021

(51) Int. Cl.
*H04L 29/06* (2006.01)
*G06F 15/173* (2006.01)
*H04L 1/00* (2006.01)
*H04L 29/08* (2006.01)

(52) U.S. Cl.
CPC ........ *H04L 69/22* (2013.01); *G06F 15/17331* (2013.01); *H04L 1/0001* (2013.01); *H04L 69/326* (2013.01)

(58) Field of Classification Search
CPC ... H04L 63/145; H04L 12/4633; H04L 69/22; H04L 45/38; H04L 67/02; G06F 16/122; H04W 28/06; H04W 72/0413
See application file for complete search history.

(56) References Cited

U.S. PATENT DOCUMENTS

| | | | |
|---|---|---|---|
| 10,523,776 B2 * | 12/2019 | Liu | H04L 67/02 |
| 2014/0032987 A1 * | 1/2014 | Nagaraj | H04L 65/80 |
| | | | 714/747 |
| 2018/0359328 A1 * | 12/2018 | Fablet | H04L 65/4084 |

* cited by examiner

*Primary Examiner* — Iqbal Zaidi
(74) *Attorney, Agent, or Firm* — Lee & Hayes, P.C.

(57) ABSTRACT

This disclosure describes techniques for a network interface controller (NIC) to communicate over a network according to a specified transmission communication protocol. The NIC receives, from a host processor, an indication of a data unit and an indication of a header template. The NIC generates, independent of the specified transmission communication protocol, metadata for transmitting a segment of the data unit over a network. The NIC generates, at last partly using the metadata, header fields that comply with the specified transmission communication protocol. The NIC processes the header template and the header fields to generate a packet header, and the NIC transmits, over the network, a packet including the packet header and the segment of the data unit.

20 Claims, 6 Drawing Sheets

CONFIGURABLE SEGMENTATION OFFLOAD

TECHNICAL FIELD

The present disclosure relates generally to segmentation offload and, more specifically, to a segmentation offload technique that is configurable for use with multiple transmission communication protocols.

BACKGROUND

Segmentation is a technique to divide a data payload into multiple parts for transmission over a network. For example, the data payload with required overhead, such as packet headers, may be larger than a maximum transmission unit that the network has an ability to transmit using a specified transmission communication protocol. In some situations, while a network may have the ability to transmit the data payload in one unit using the specified transmission communication protocol, such transmission may be unreliable or adversely affect the network, due to network properties or environmental conditions. For example, transmitting a long packet on a slow link may prevent other transmissions on the link during transmission of the long packet, causing delays to subsequent packets. Breaking a long packet up into smaller units (segments) for transmission can give other packets an opportunity to use the same link. As another example, an error during transmission of a long packet (e.g., caused by intermittent noise) can necessitate retransmission of the entire long packet, even if the error involves only a small part of the long packet.

Segmentation, when used, is typically carried out at the transport layer of the Open Systems Interconnection (OSI) networking model. For example, one transport layer communication protocol that defines a mechanism for segmentation includes TCP. User Datagram Protocol (UDP) is another transport layer transmission communication protocol that defines a mechanism for segmentation.

Segmentation can be overhead-intensive. Therefore, some host CPU's, that are in communication with one or more peer devices via a network, offload segmentation to one or more specialized processors. This can alleviate some transmission overhead from the host CPU. For example, the one or more specialized processors to which a host CPU may offload segmentation may be part of a network interface controller (NIC). The NIC may provide an interface between the host CPU and a network, and the NIC may handle other transmission communication protocol operations, for both transmission and reception, besides segmentation. Segmentation offload may also be referred to as large send offload.

In an example of segmentation offload, a host CPU may provide a NIC with a pointer to a data unit to be transmitted over a network. The amount of data in the data unit to be transmitted may, for example, be larger than the network or a transmission communication protocol allow, or transmitting the large amount of data in the data unit as one or more very large packets may adversely affect operation of the network. The NIC may include segmentation functionality to allocate the data of the data unit to multiple segments, for transmission on the network in multiple packets.

The NIC may form the multiple packets in part by, for example, forming a header for each of the multiple packets that is appropriate according to the transmission communication protocol. Because the header for each of the multiple packets is appropriate according to the transmission communication protocol, a peer receiving the multiple packets can process the headers of the multiple packets and consume the data payload within the packets. This may include, for example, reassembling the data payload of the multiple packets into the data unit that was originally indicated or provided by the host CPU to the NIC.

For example, if the transmission communication protocol is Transmission Control Protocol (TCP), the NIC may break the data of the data unit into smaller segments, and then add TCP, Internet Protocol (IP) and data link layer protocol headers to each segment using a TCP-specific template header provided to the NIC by the TCP stack running on the host CPU. The NIC may then transmit the resulting packets over the network. Each packet uses a unique header, due at least to the sequence number in each packet being different. The NIC knows how to generate the correct unique header for each packet.

It may be desirable for a NIC to have the ability to support segmentation offload for a variety of transmission communication protocols while providing for the NIC to be configured to support segmentation offload for additional transmission communication protocols not previously supported by the NIC.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
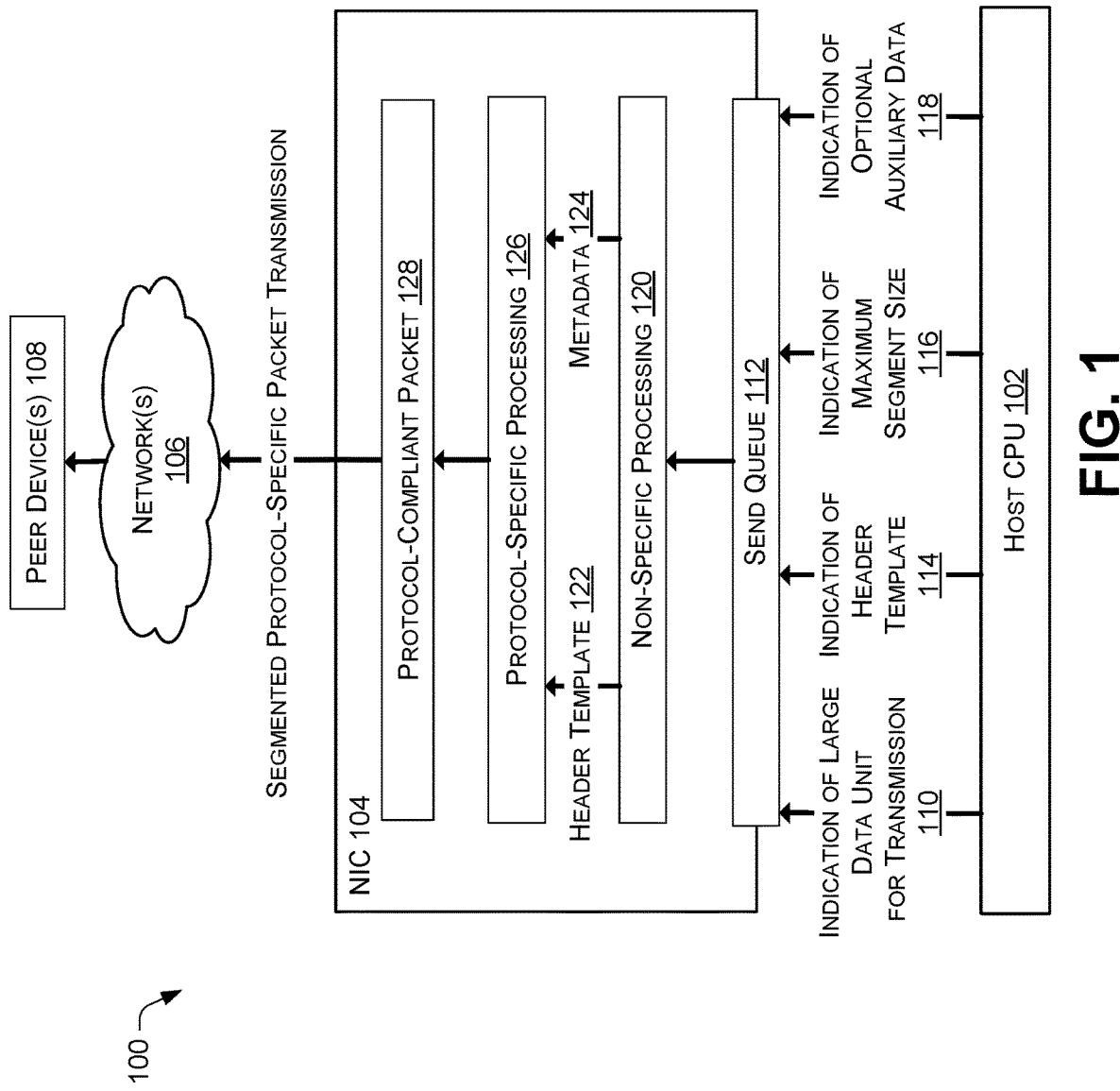
FIG. 1 illustrates a system-architecture diagram of an example environment in which a configurable segmentation offload may be carried out.

This disclosure describes techniques for a NIC to support segmentation offload for a variety of transmission communication protocols. The NIC receives, from a host processor, an indication of a data unit and an indication of a header template. The NIC generates, independent of the specified transmission communication protocol, metadata for transmitting a segment of the data unit over a network. The NIC generates, at last partly using the metadata, header fields that comply with the specified transmission communication protocol. The NIC processes the header template and the header fields to generate a packet header, and the NIC transmits, over the network, a packet including the packet header and the segment of the data unit.

Additionally, the techniques described herein may be performed by a system and/or device having non-transitory computer-readable media storing computer-executable instructions that, when executed by one or more processors, performs the method described above.

EXAMPLE EMBODIMENTS

In some examples, protocol-specific support for segmentation offload is isolated to a small portion of the NIC segmentation offload processing, For the NIC to support segmentation offload for an additional transmission communication protocol not previously supported by the NIC, only minimal changes are made, to the small portion of the NIC. In some examples, the NIC generates generic protocol-agnostic metadata based on information about a large data unit to be transmitted and how the large data unit is to be segmented, where the large data unit is provided by the host CPU as part of a large send request posted to the NIC. The minimal required changes to the NIC are to provide rules specific to the transmission communication protocol, for the NIC to rewrite portions of a static header template, based on the protocol-agnostic metadata, to conform with the transmission communication protocol.

In some examples of segmentation offload for a large send request, the NIC may receive from a host CPU an indication of a large data unit in a send queue, such as a pointer to the first byte of data in the send queue for the large send request. The NIC may also receive from the host CPU an indication of a packet header template that includes a static header template usable to build a protocol-specific header for each packet to be transmitted by the NIC, to fulfill the large send request. The header template may include, for example, static fields that indicate the host CPU as the source of the large send request and a peer device that is the destination of the large send request, with other (non-static) fields of the header to be written and/or updated according to the protocol-specific rules based on the protocol-agnostic metadata.

The NIC may segment the indicated large data unit into segments based, for example, on a maximum segment size (MSS) indication the host CPU provides to the NIC as part of posting the large send request. The MSS may, for example, be dictated by a particular transmission communication protocol or may otherwise be specifiable by the host CPU. For example, a system administrator may configure the host CPU to specify a particular MSS.

For each segment to be transmitted, the NIC may, based on the segment size the host CPU indicates, generate metadata describing each of multiple segments for transmitting the large data unit. The metadata is not specific to any transmission communication protocol but, rather, may apply to a plurality of transmission communication protocols that may utilize segmented transmission. For example, the metadata for a segment may include a payload size, a sequence number within the send, and data offset within the send. Optional metadata may include auxiliary data size and contents, and a transfer stage.

For example, the NIC may update the sequence number metadata for each segment, typically starting at zero for the first segment, then one for the next segment, and so on. The data offset within the send is an indication of where a segment is in relation to the large data unit. For example, if the host CPU indicates a segment size of "x" in the large send request, the offset may be zero for the first segment, "x" for the second segment, "2*x" for the third segment, and so on.

For each segment to be transmitted, the NIC may provide the header template, including the static fields, and the metadata to the small portion of the NIC segmentation offload processing that is protocol-specific. The small portion of the NIC segmentation offload processing that is protocol-specific may be executed by a specialized processor of the NIC, such as a reduced instruction set computer (RISC) processor.

The small portion of the segmentation offload processing that is protocol-specific processing may rewrite non-static fields of the header template to be protocol-compliant based on metadata that describes how the header template is to be transformed into a protocol-compliant header for a packet holding a segment. For example, a starting sequence number specified in the header template may be re-written using a relative segment sequence number from the packet metadata. In this way, the protocol-specific processing may be stateless. That is, the protocol-specific processing does not need to retain any state from packet to packet but, rather, may rewrite the header based on well-defined rules of the specified transmission communication protocol as applied to the metadata provided to the protocol-specific processing by the segmentation offload processing.

For example, the transmission communication protocol for the large data unit send may be Remote Direct Memory Access (RDMA) as specified in RFC 5040 (October 2007) and as extended by RFC 7306 (June 2014). The RDMA protocol includes a concept of "immediate data" which may be included in the header of one of the packets that transmit the RDMA segments. The NIC, as part of the protocol-specific NIC segmentation offload processing, may recognize that the large send request includes immediate data. The NIC may recognize this, for example, from an indication in the header template the host CPU provides as part of the large send request. The NIC, as part of the protocol-specific segmentation offload processing, may include auxiliary data that the host CPU also provides as part of the large send request, in the protocol compliant header at the appropriate location in the header as defined by the RDMA protocol.

As another example, the transmission communication protocol for the large data send may be TCP. The NIC, as part of the protocol-specific segmentation offload processing, may update an offset field in the protocol-specific packet header based, for example, on knowledge provided by the metadata of which segment is to be included in the packet and the segment size.

Other metadata may include an indication of whether the segment to be included in a packet is the first segment, the last segment, or a segment between the first segment and last segment (i.e., middle segment). The NIC, as part of the protocol-specific segmentation offload processing, may modify the protocol-compliant header as appropriate for the protocol, to indicate the first, last or middle. This is information, defined by the protocol, that the peer device receiving the large data unit in segments may use to reassemble the segments into the large data unit. A packet may be both first and last, or "only."

Thus, for example, the NIC may perform segmentation offload for multiple different protocols using the same send queue. In one example, the host CPU posts a pointer to data to be transmitted (e.g., a scatter/gather list) as well as a pointer to, and an indication of the length of, a header template. The header template may be a buffer containing static information fields the NIC can use to construct a portion of a header for each segment packet to be transmitted.

The host CPU may also post an indication of a per-packet payload size (sometimes known as maximum segment size, or MSS) for the segmented packets, as well as optional auxiliary data for each packet. The optional auxiliary data may be data specific to a particular send that may be employed in some arbitrary manner by the NIC at header generation time.

The NIC may generate metadata for each segment to be transmitted that includes information usable by the NIC to complete the stateful, non-static, portion of each segment packet to be transmitted. For example, the metadata may include an indication of a sequence number within the send, a data offset within the send and/or an indication of transfer stage (such as "first," "middle" or "last"). This is information commonly employed in many stateful transmission communication protocols, such as in the RDMA protocol.

In general, the data posted by the host CPU to the send queue, along with the generated metadata, is sufficient for the NIC, using the static header template, to create protocol-specific packets (including protocol-specific headers) during a segmenting operation. In some examples, the NIC may be configured or reconfigured to perform offload segmentation according to specified transmission communication protocols, such as by providing or updating firmware in the NIC that is tailored to the specified transmission communication protocols.

In some examples, the NIC includes a supervisory processor executing a supervisory program. The supervisory processor executing the supervisory program may recognize that the NIC is being requested to support large segment offload for a specified transmission communication protocol. For example, the host CPU may provide instructions to the supervisory processor of the NIC, via an application programming interface, that the host CPU will be making large send requests to the NIC using the specified transmission communication protocol. Based at least in part on the recognition that the NIC is being requested to support large segment offload for the specified transmission communication protocol, the supervisory processor may configure the protocol-specific segmentation offload processing to support large segment offload for the specified transmission communication protocol. For example, the supervisory processor may respond by loading a protocol-specific program, or protocol-specific rules, into a "rewrite engine" of the NIC, such that the NIC is configured to rewrite header templates, that the host CPU provides, according to the specified transmission communication protocol.

The techniques described herein may be performed by a system and/or device having non-transitory computer-readable media storing computer-executable instructions that, when executed by one or more processors, performs the methods described herein.

The techniques described herein are generally applicable to any type of protocol, implemented at any layer, in which large data units are segmented for transmission. Similarly, the techniques may be applied to segment large data units for transmission along multi-hop paths between hardware devices, virtual resources (e.g., virtual machines, containers, etc.) running on devices, and/or any combination thereof. The techniques described herein improve upon previous techniques by enabling by enabling easy configuration of NICs or other segmentation offloading circuitry for use with various protocols.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 that includes a host CPU 102, a network interface controller (NIC) 104, one or more networks 106 and one or more peer devices 108. The one or more networks 106 may be any type of network that would over which large data units may be transmitted. One example of an application which may transmit large data units is a file server providing large files over a network. Transmitting a large data unit over a network as a single packet may exceed the capability of the network or, in some cases, transmitting a large data unit over a network as a single packet may require more overhead than if the large data unit is segmented and transmitted as multiple packets.

In the FIG. 1 example environment, the NIC 104 offloads segmentation of large data units from the host CPU 102. When the host CPU 102 needs to send a large data unit to one or more peer devices 108 via the one or more networks 106, the host CPU 102 provides an indication 110 of the large data unit to a send queue 112. The send queue 112 is memory that is accessible to both the host CPU 102 and to the NIC 104. For example, the send queue 112 may be in local memory of the host CPU 102, may be in local memory of the NIC 104, or may be in memory that is local to neither the host CPU 102 nor the NIC 104.

The host CPU 102 provides additional information and/or instructions to the send queue 112 about segmenting the large data unit for transmission to the one or more peer devices 108 via the network 106. For example, the host CPU 102 may provide an indication of a header template 114 according to a transmission communication protocol stack being operated by the host CPU 102 for communication with the one or more peer devices 108. The host CPU 102 may also provide an indication 116 of a maximum segment size (MSS) that specifies the maximum amount of data (typically in bytes) that the NIC 104 should provide in any segment it creates from the large data unit. Some transmission communication protocols also allow for additional data to be transmitted along with the large data unit, in a packet header. This may include, for example, immediate data included in the header of a packet transmitted in accordance with the RDMA protocol. The host CPU 102 may also provide an indication 118 of auxiliary data.

Providing an indication 110 of the large data unit for transmission, and indication 114 of a header template, an indication 116 of a maximum segment size, and an indication 118 of auxiliary data may include providing a pointer or providing the actual data itself. For example, the header template may be stored in a memory accessible to the host CPU 102, and the indication 114 of the header template may be a pointer to the memory where the header template is stored. In some examples, the indication may be the data itself. For example, the indication 114 of the header template may be the header template itself.

Non-specific processing 120 of the segmentation offload processing by the NIC 104 passes the header template 122 and metadata 124 to protocol-specific processing 126 of the segmentation offload processing by the NIC 104. For example, there is certain processing that is common for segmentation no matter what the protocol. The non-specific processing may include that common processing. In one example, the non-specific processing includes determining metadata 124 such as a payload size, a sequence number within the large data unit send, and data offset within the large data unit send. Some metadata may be used for only some transmission communication protocols and may, for example, include auxiliary data size and contents, and a transfer stage.

The non-specific processing 120 may determine the payload size for a segment based on how the NIC segments the large data unit. The non-specific processing 120 may update the sequence number by one for each subsequent segment it processes. The non-specific processing 120 may determine the data offset based on where the segment begins in relation to the beginning of the large data unit, and this is typically an integer multiple of the segment size. Metadata that is auxiliary data may, for example, be the auxiliary data indicated by the indication 118 of auxiliary data the host CPU 102 provides to the NIC 104.

The non-specific processing 120 may provide an indication of "first" for the first segment of the large data unit, an indication of "last" for the last segment of the large data unit, and an indication of "middle" for any segment that is neither the first segment nor the last segment of the large data unit.

The protocol specific processing 126 may utilize the header template 122 and the metadata 124 to generate a protocol-compliant packet 128 that includes a protocol-compliant header and a segment of the large data unit. The NIC 104 transmits the protocol-compliant packet 128 to the one or more peer devices 108 via the one or more networks 106.

Figure 2:
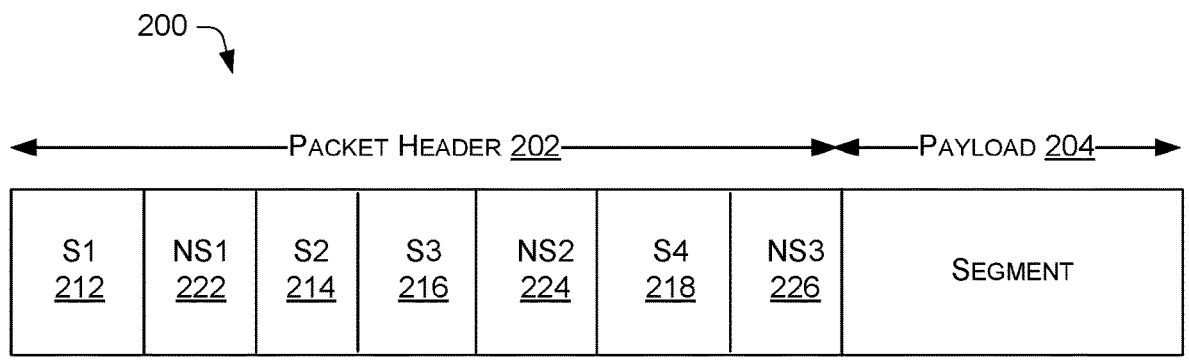
FIG. 2 illustrates an example format of a packet with static fields and non-static fields.

FIG. 2 illustrates an example format of a packet 200. The packet 200 includes a packet header portion 202 and a payload portion 204. The packet header portion 202 includes three fields—S1 212, S2 214 and S3 216—that are static for any packet via which a NIC transmits a segment of a large data unit that a CPU requests the NIC to transmit. The static fields S1 212, S2 214 and S3 216 are fields included in a header template such as the header template that the host CPU 102 indicates (114) to the NIC 104 as part of a large data send request to the NIC 104.

The packet header portion 202 also includes three non-static fields—NS1 222, NS2 224 and NS3 226—that change for each packet the NIC transmits to transmit a segment of a large data unit that the CPU request the NIC to transmit, according to the transmission communication protocol the NIC uses to transmit the packet. The non-static fields NS1 222, NS2 224 and NS3 226 are fields that protocol-specific processing of a NIC, such as protocol specific processing 126, determine based on at least two different data entities. The NIC determines the non-static fields based on at least (1) header template that the host CPU 102 indicates (114) to the NIC 104 as part of a large data send request to the NIC 104 and (2) metadata 124 determined by the non-specific processing 120.

The packet header portion 202 also includes a payload portion 204. The payload portion 204 is inserted into the packet by the NIC 104 and includes a segment of a large data unit that a CPU requests the NIC to transmit.

Figure 3:
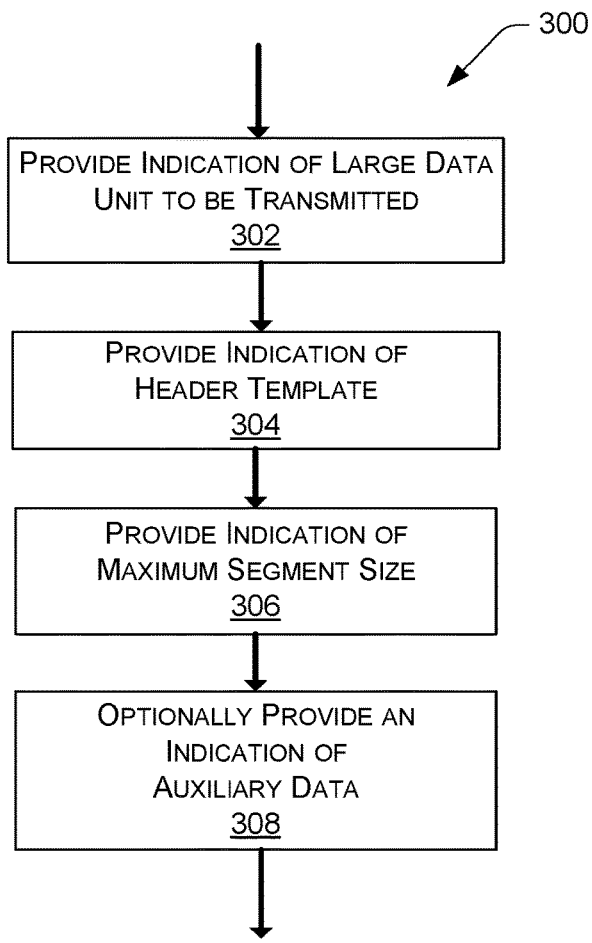
FIG. 3 is a flowchart illustrating an example process for host CPU to post a request to a NIC to transmit a large data unit.

FIG. 3 is a flowchart illustrating an example process 300 for host CPU (such as host CPU 102) to post a request to a NIC (such as the NIC 104) to transmit a large data unit. For example, a user application being executed by the host CPU may include a call to a protocol library being executed by the host CPU, such as a send request. The user application may include, as part of the send request or other call, a pointer to a large data unit to send. The protocol library may include driver or other hardware interface code that causes the host CPU to execute the FIG. 3 process 300 or other example process to post a request to the NIC to transmit a large data unit. In some examples, the code that causes the host CPU to execute the FIG. 3 process 300 or other example process to post a request to the NIC to transmit a large data unit is part of an operating system kernel protocol stack being executed by the host CPU.

Turning to FIG. 3, at 302, the host CPU provides to the NIC an indication of the large data unit to be transmitted. For example, the indication may be a pointer to a scatter/gather list in a send buffer or other memory accessible to the NIC, or an actual scatter/gather list. For example, the scatter/gather list may be a list of pointers, where each pointer is to a segment of the large data unit in a to be transmitted in a memory accessible to the NIC. In some examples, the indication is a pointer to the large data unit as a whole, such as a pointer to the large data unit in a send buffer or other memory accessible to the NIC. In these examples, where the indication is a pointer to the large data unit as a whole, the NIC may have responsibility for determining segments of the large data unit, as opposed to being informed by the host CPU (such as via a scatter/gather list) what are the segments.

Still referring to FIG. 3, at 304, the host CPU provides to the NIC an indication of a header template. The header template may be, for example, a template for a packet header usable by the NIC to transmit segments of the large data unit according to a specified transmission communication protocol. More particularly, the host CPU may provide an indication of a template that includes static information of such a packet header, such as source address, destination address, and length of the large data unit. These are examples, and there are other examples in which the host CPU provides an indication of a template that includes different static information. The NIC may use the header template as a foundation to build a header for packets to transmit the segments of the large data unit.

At 306, the host CPU provides to the NIC an indication of the maximum segment size for each segment of the large data unit to be transmitted by the NIC to one or more peer devices via a network. The maximum segment size may, for example, be a transmission communication protocol feature. In some examples, a network administrator sets a maximum segment size for transmissions from the host CPU via the NIC. In some examples, different large data unit sends, even using the same transmission communication protocol, may have different maximum segment sizes. The NIC may use the maximum segment size to set certain non-static fields in the headers of packets transmitting segments of the large data unit from the NIC to one or more peer devices via a network. In some examples, the NIC may be determining the segments of the large data unit, and the NIC may use the maximum segment size to determine the segments of the large data unit.

At 308, the host CPU optionally provides to the NIC an indication of auxiliary data for the large data unit send. The optional auxiliary data may be data specific to a particular send that may be employed in some arbitrary manner by the NIC at header generation time. In one example, the auxiliary data is "immediate" data the NIC may include in a header of one or more packets transmitting segments of the large data unit from the NIC to one or more peer devices via a network. For example, the RDMA transmission communication protocol defines a mechanism for transmitting immediate data. The indication of auxiliary data may be provided separate from the indication of the header template since the immediate data may not be static for all packets transmitting segments of the large data unit from the NIC. That is, according to some protocols, the auxiliary data is provided in only one such packet, such as the first packet all packets transmitting segments of the large data unit.

Figure 4:
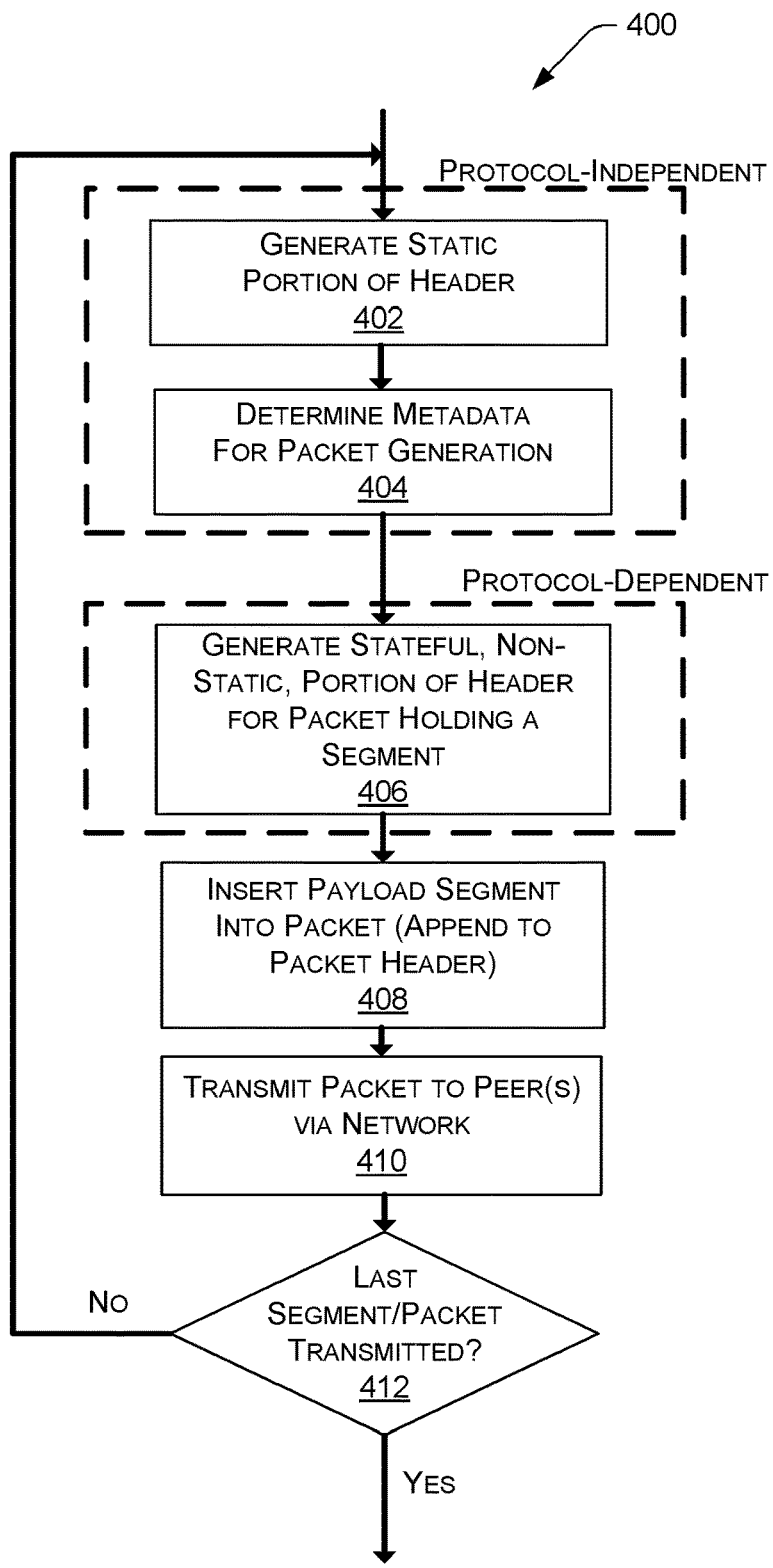
FIG. 4 is a flowchart illustrating an example process for a NIC to service a request from a host CPU to send a large data unit in segments to one or more peer devices via a network.

FIG. 4 is a flowchart illustrating an example process 400 for a NIC (such as NIC 104) to service a request from a host CPU (such as the host CPU 102) to send a large data unit in segments to one or more peer devices via a network. A host CPU may have provided the request using the example process 300, for example, though there are other examples of how a host CPU may have provided the large data unit send request. The process 400 includes operations 402 and 404, that are protocol-independent, and the process 400 includes operation 406, which is protocol dependent.

At 402, as part of the protocol-independent operation of the segmentation offload performed by the NIC in servicing the large data unit send request, the NIC generates the static portion of a header that the NIC will include in each packet that includes a segment of the large data unit, being transmitted from the NIC to one or more peer devices via a network. In some examples, the NIC generates the static portion of the header by copying the header template that the host CPU provided to the NIC as part of the large data unit send request. That is, the header template may have all the static information to be included in the header of every such packet.

At 404, also part of the protocol-independent operation of the segmentation offload performed by the NIC in servicing the large data unit send request, the NIC determines metadata for a packet. The metadata may include, for example, a size of the packet, including the size of the header and the size of the segment of the large data unit included in the packet. The NIC may determine the size of the segment of the large data unit included in the packet using an indication of MSS provided by the host CPU as part of the send request. In some examples, for at least some of the packets, the size of the segment of the large data unit included in the packet is not the same as the MSS. For example, the size of the large data unit may not be an integer multiple of the MSS such that at least one packet may have less data in a segment than the MSS.

As another example, the metadata that the NIC determines for a packet may include a sequence number within a large data unit send. For example, the NIC may determine the sequence number for the first packet of the large data unit send to be "0." The NIC may determine the sequence number for the second packet of the large data unit send to be "1" and so on.

As another example, the metadata that the NIC determines for a packet may include a data offset within a large data unit send. In some examples, the NIC determines an offset based on the sizes of the segments included in previous packets of the large data unit send. For example, for the first packet of a large data unit send, the NIC may determine the offset to be "0." For the second packet of a large data unit send, the NIC may determine the offset to be the size of the segment included in the first packet. For the third packet of a large data unit send, the NIC may determine the offset to be the sum of the size of the segment included in the first packet and the size of the segment included in the second packet.

As another example, the metadata that the NIC determines for a packet may include a size of auxiliary data and contents. The NIC may determine this metadata for each packet of a large data unit send, without regarding for which packet the metadata is currently being determined. For example, a determination of which packet is to include the auxiliary data may be something that is protocol-specific, and the FIG. 4 operations 402 and 404 are intended to be protocol-independent.

As another example, the metadata that the NIC determines for a packet may include an indication of whether the packet is the first packet of the large data unit send, the last packet of the large data unit send, or a packet between the first packet of the large data unit send and the last packet of the large data unit send. In some examples, the metadata that the NIC determines for a packet may include an "only" indication, indicating that the packet is the only packet to be transmitted by the NIC to accomplish the large data unit send.

Still referring to FIG. 4, the operation 406 is part of the small portion of protocol-dependent operations being handled by the NIC in handling the large data send. At 406, the NIC generates the stateful, non-static, portion of the header for a packet. In one example, a portion of the NIC that performs the operation 406 may be called a rewrite engine, since the operation is to rewrite the static header, generated from the header template, with stateful, non-static, information for transmitting a segment in a packet according to a particular transmission communication protocol. At 406, for example, the NIC may generate the stateful, non-static, portion of the header for a packet using the metadata, determined by the NIC in a protocol-independent manner, based on rules that are particular to the transmission communication protocol with which the NIC transmits packets for the large data unit send to one or more peers via a network.

In one example, the transmission communication protocol is TCP, and the NIC generates the stateful non-static portion of the header using the metadata, based on rules that are particular to the TCP transmission communication protocol. For example, such fields may include sequence number, acknowledgement number and data offset. In another example, the transmission communication protocol is RDMA, and the NIC generates the stateful, non-static, portion of the header using the metadata, based on rules that are particular to the RDMA transmission communication protocol. For example, such fields may include packet sequence number. In other examples, other transmission communication protocols are used. In some examples, the transmission communication protocol is at the transport layer of the ISO network layer model but, in other examples, the transmission communication protocol is at a different layer of the ISO network layer model, other than the transport layer.

At 408, the NIC appends a segment of the large data unit to the header generated at 402 and 406, to form the packet for transmitting a segment according to a particular transmission communication protocol. At 410, the NIC transmits the packet to one or more peers via a network.

The operations 402, 404, 406, 408 and 410 may pertain to one of a plurality of packets for transmitting segments of a large data unit to one or more peers via a network. At 412, the NIC determines if the last segment (and, thus, packet) for transmitting the large data unit has been transmitted. If the NIC determines the last segment (and, thus, packet) for transmitting the large data unit has not been transmitted, the NIC goes back to 402 to generate the static portion of a header for the packet to transmit the next segment of the large data unit. If the NIC determines the last segment for transmitting the large data unit has been transmitted, the FIG. 4 example process 400 is complete.

Figure 5:
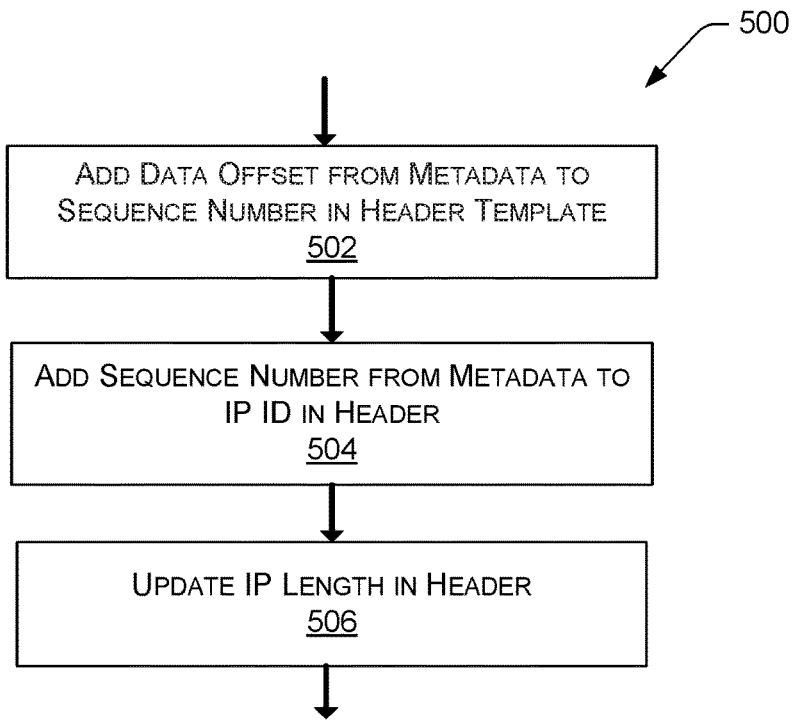
FIG. 5 is a flowchart illustrating an example process for a NIC to generate a stateful, non-static, portion of a header for a packet to send a segment of a large data unit via the TCP transmission communication protocol.

FIG. 5 is a flowchart illustrating an example process 500 for a NIC (such as NIC 104) to generate a stateful, non-static, portion of a header for a packet holding a segment, responsive to a request from a host CPU (such as the host CPU 102), to send a large data unit in segments to one or more peer devices via a network via the TCP transmission communication protocol. The process 500 is just one example of a process for a NIC to generate a stateful, non-static, portion of a header for a packet holding a segment, to a request from a host CPU, to send a large data unit in segments to one or more peer devices via a network via the TCP transmission communication protocol. For such processing, the payload size, data offset, and sequence number from metadata are utilized to generate a stateful, non-static portion of a header. In one example, even if determined, the transfer stage indication in the metadata may not be used.

Referring to FIG. 5, at 502, the NIC adds the data offset determined by the NIC, as part of the metadata, to the sequence number in the header template the host CPU provides to the NIC for the large data unit transfer, to generate the TCP Sequence parameter. At 504, the NIC adds the sequence number determined by the NIC, as part of the metadata, to an IP ID field from the header template the host CPU provides to the NIC for the large data unit transfer to generate part of the IP header. At 506, the NIC updates the IP length in the header, such as by adding the MSS to the sum of the lengths of the IPv4 and TCP headers.

Figure 6:
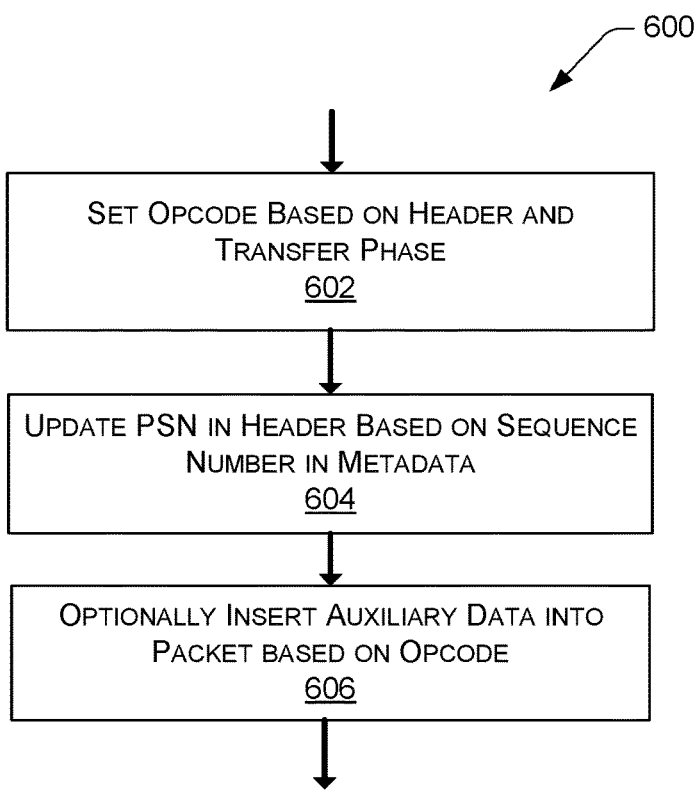
FIG. 6 is a flowchart illustrating an example process for a NIC to generate a stateful, non-static, portion of a header for a packet to send a segment of a large data unit via the RDMA transmission communication protocol.

FIG. 6 is a flowchart illustrating an example process 600 for a NIC (such as NIC 104) to generate a stateful, non-static, portion of a header for a packet holding a segment, responsive to a request from a host CPU (such as the host CPU 102), to send a large data unit in segments to one or more peer devices via a network via the RDMA transmission communication protocol. The process 600 is just one example of a process for a NIC to generate a stateful, non-static, portion of a header for a packet holding a segment, to a request from a host CPU, to send a large data unit in segments to one or more peer devices via a network via the RDMA transmission communication protocol. For such processing, the payload size, data offset, and sequence number from metadata are utilized to generate the stateful, non-static portion of a header.

Referring to FIG. 6, at 602, the NIC sets an opcode in the header based on the header template the host CPU provides to the NIC as part of the large data send request in combination with a transfer phase indicated in the metadata. The opcode is a 1:1 mapping from operation type and transfer phase. At 604, the NIC generates the packet serial number (PSN) based on the sequence number in the metadata. Header template or auxiliary data will have a "starting sequence number" so "Packet Sequence Number" may equal the starting sequence number plus the sequence number from metadata.

At 606, the NIC inserts any optional auxiliary data, if present, based on the opcode, using a lookup of the opcode in a table, for example.

Figure 7:
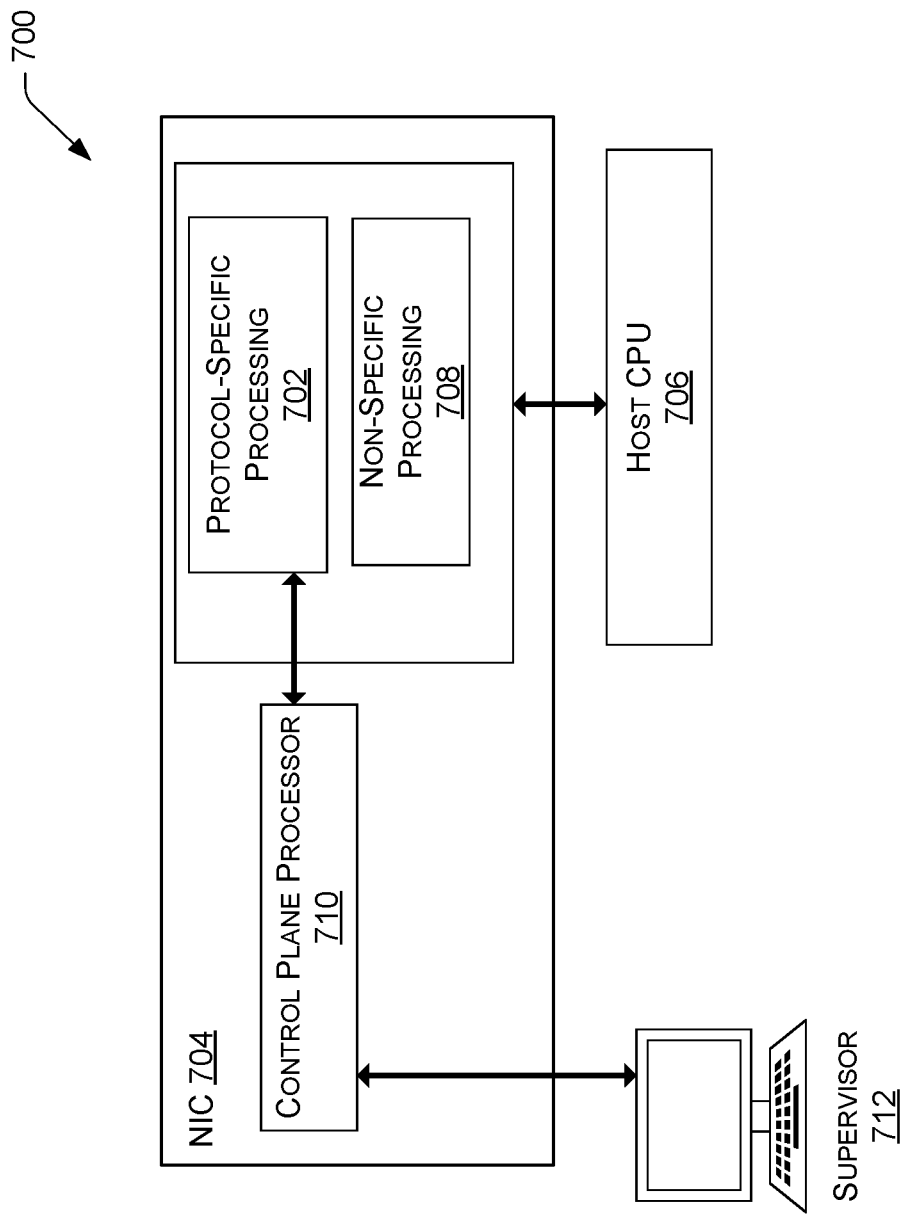
FIG. 7 illustrates an example architecture 700 that may be used to modify the protocol-specific processing a NIC.

FIG. 7 illustrates, in a simplified manner, an example architecture 700 that may be used to modify the protocol-specific processing 702 of a NIC 704, such as to configure the NIC 704 to assemble packets for transmitting segments of a large data unit that a host CPU 706 requests the NIC 704 to transmit to one or more peers via a network. The non-specific processing 708 of the NIC remains unchanged regardless of transmission communication protocol with which the NIC 704 transmits the segments.

The NIC 704 may include a control plane processor 710 that, in interaction with a supervisor 712, operates to modify the protocol-specific processing 702 of the NIC 704. For example, an operator may interact with the supervisor 712 to cause the supervisor to download, to the control plane processor 710 of the NIC 704, a program and/or rules for carrying out the protocol-specific processing 702. The control plane processor 710 may download the program and/or rules to the protocol-specific processing 702 of the NIC 704.

For example, the program may be a very small object code module configured to cause a processor of the NIC 704 to execute the protocol-specific processing 702 for a transmission communication protocol which the NIC 704 for which the protocol-specific processing 702 was not formerly configured to process packets. As another example, the rules may be meta-rules that, when operated by the protocol-specific processing 702, configures the protocol-specific processing 702 to process packets using the transmission communication protocol which the NIC 704 was not formerly configured to process packets. In some examples, the NIC 704 may have been formerly configured to process packets using the transmission communication protocol, and the program and/or rules the control plane processor 710 downloads are to modify how the protocol-specific processing 702 implements the transmission communication protocol.

Figure 8:
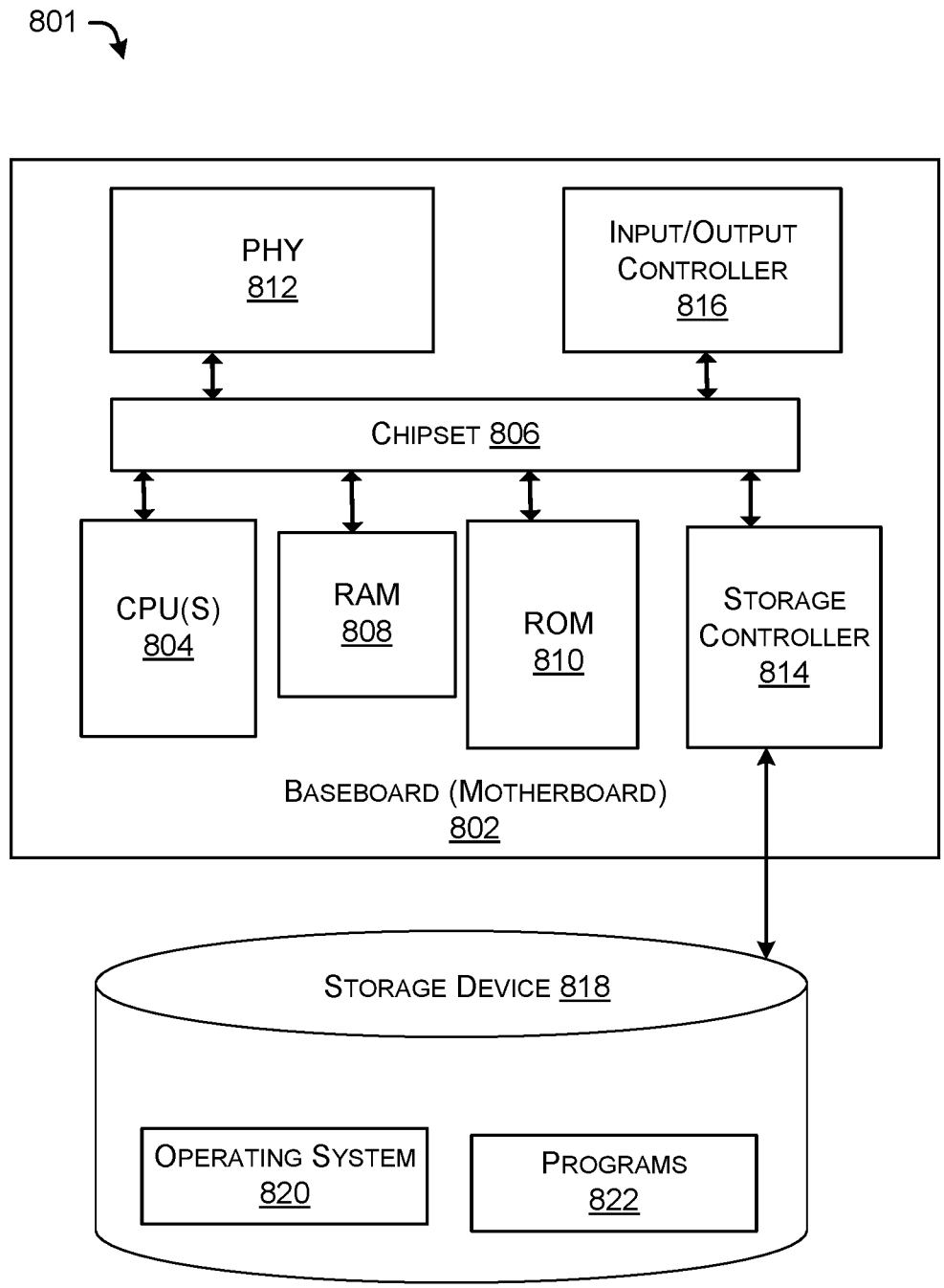
FIG. 8 is a computer architecture diagram showing an illustrative computer hardware architecture for implementing a NIC that can be utilized to implement aspects of the various technologies presented herein.

FIG. 8 illustrates an example architecture of a NIC 800 capable of executing program components for implementing the functionality described above. The device architecture shown in FIG. 8 illustrates a NIC or other computing device that can be utilized to execute any of the software components presented herein. The NIC 800 may, in some examples, correspond to a physical NIC or a virtual NIC, and may comprise networked devices such as servers, switches, routers, hubs, bridges, gateways, modems, repeaters, access points, etc.

The NIC 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the NIC 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 802. The chipset 806 can further provide an interface to a computer-readable storage medium such as a read-only memory ("ROM") 810 or non-volatile RAM ("NVRAM")

for storing basic routines that help to startup the NIC 800 and to transfer information between the various components and devices. The ROM 810 or NVRAM can also store other software components necessary for the operation of the NIC 800 in accordance with the configurations described herein.

The NIC 800 can operate in a networked environment using logical connections to remote computing devices and computer systems through one or more networks, such as the one or more networks 106. The chipset 806 can include functionality for providing network connectivity through a physical interface (PHY) 812, such as the PHY of a gigabit Ethernet adapter. The PHY 812 can connect the NIC 800 to other computing devices over the one or more networks. It should be appreciated that multiple PHYs 812 can be present in the NIC 800, connecting the NIC to other types of networks and remote computer systems.

The NIC 800 can be connected to a storage device 818 that provides non-volatile computer-readable media storage for the computer. The storage device 818 can store an operating system 820, programs 822, and data, which have been described in greater detail herein. The storage device 818 can be connected to the NIC 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The NIC 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the NIC 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The NIC 800 can further read information from the storage device 818 by detecting the physical states or characteristics of one or more particular locations within the physical storage units.

In addition to the mass storage device 818 described above, the NIC 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the NIC 800. In some examples, the operations performed by the network, and or any components included therein, may be supported by one or more devices like NIC 800. Stated otherwise, some or all the operations performed by the network, and or any components included therein, may be performed by one or more NICs 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the NIC 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 818 can store other system or application programs and data utilized by the NIC 800.

In one embodiment, the storage device 818 or other computer-readable storage media is encoded with computer-executable instructions which, when loaded into the NIC 800, transform the computer from a general-purpose computing system into a special-purpose computer capable of implementing the embodiments described herein. These computer-executable instructions transform the NIC 800 by specifying how the CPUs 804 transition between states, as described above. According to one embodiment, the NIC 800 has access to computer-readable storage media storing computer-executable instructions which, when executed by the NIC 800, perform the various processes described above with regard to FIGS. 1-6. The NIC 800 can also include computer-readable storage media having instructions stored thereupon for performing any of the other computer-implemented operations described herein.

The NIC 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the NIC 800 might not include all the components shown in FIG. 8, can include other components that are not explicitly shown in FIG. 8, or might utilize an architecture completely different than that shown in FIG. 8.

As described herein, the NIC 800 may include one or more hardware processors 804 (processors) configured to execute one or more stored instructions. The processor(s) 804 may comprise one or more cores. Further, the NIC 800 may include one or more network interfaces configured to provide communications between the NIC 800 and other devices such as peer devices with which a host CPU is communicating. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for receiving, processing and/or transmitting a multicast join message, as well as other operations described herein. For instance, the programs 822 may cause the NIC 800 to perform techniques for communicating with other devices using any type of protocol or standard usable for determining connectivity. Additionally, the programs 822 may comprise instructions that cause the NIC 800 to perform the specific techniques for enabling multi-hop connectivity determination.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method of communicating over a network according to a specified transmission communication protocol, comprising:
   receiving, from a host processor, an indication of a data unit and an indication of a packet header template, the packet header template defining at least one or more static packet header fields of a packet header and one more non-static packet header fields of the packet header;
   generating metadata for transmitting a segment of the data unit over a network, wherein the metadata is not specific to the specified transmission communication protocol;
   generating, at least partly using the metadata, the static packet header fields of the packet header;
   generating, at last partly using the metadata and the static packet header fields, the non-static packet header fields that comply with the specified transmission communication protocol;
   processing the packet header template, the static packet header fields and the non-static packet header fields to generate the packet header; and
   transmitting, over the network in accordance with the specified transmission communication protocol, a packet including the packet header and the segment of the data unit.

2. The method of claim 1, wherein the metadata specifies at least one of a payload size of the packet, a sequence number associated with the segment, or a data offset associated with the segment.

3. The method of claim 1, wherein the metadata includes auxiliary data and the static packet header fields include the auxiliary data.

4. The method of claim 1, wherein the specified transmission communication protocol includes at least one of a Transmission Control Protocol (TCP) or Remote Direct Memory Access (RDMA).

5. The method of claim 1, wherein the specified transmission communication protocol is a first specified transmission communication protocol, and the method further comprises configuring the metadata processing to generate non-static packet header fields to comply with a second specified transmission communication protocol.

6. The method of claim 5, wherein configuring the metadata processing to generate the non-static packet header fields to comply with a second specified transmission communication protocol includes causing program instructions to be downloaded into a processor and configuring the processor to execute the program instructions to generate the non-static packet header fields complying with the second specified transmission communication protocol.

7. The method of claim 1, wherein receiving, from the host processor, an indication of a large data unit includes receiving, from the host processor, a pointer to a scatter/gather list pointing to at least the segment of the data unit.

8. A network interface controller, comprising:
   one or more processors and one or more non-transitory computer-readable media storing computer-executable instructions that, when executed by the one or more processors, cause the one or more processors to:
   receive, from a host processor, an indication of a data unit and an indication of a packet header template, the packet header template defining at least one or more static packet header fields of a packet header and one or more non-static packet header fields of the packet header;
   generate metadata for transmitting a segment of the data unit over a network, wherein the metadata is not specific to a specified transmission communication protocol;
   generate, at least partly using the metadata, the static packet header fields of the packet header;
   generate, at least partly using the metadata and the static packet header fields, the non-static packet header fields that comply with the specified transmission communication protocol;
   process the packet header template, the static packet header fields and the non-static packet header fields to generate the packet header; and
   transmit, over the network in accordance with the specified transmission communication protocol, a packet including the packet header and the segment of the data unit.

9. The network interface controller of claim 8, wherein the metadata specifies at least one of a payload size of the packet, a sequence number associated with the segment, or a data offset associated with the segment.

10. The network interface controller of claim 8, wherein the metadata includes auxiliary data and the static packet header fields include the auxiliary data.

11. The network interface controller of claim 8, wherein the specified transmission communication protocol includes at least one of Transmission Control Protocol (TCP) or Remote Direct Memory Access (RDMA).

12. The network interface controller of claim 8, wherein the specified transmission communication protocol is a first specified transmission communication protocol, and the instructions further cause the metadata processing to generate non-static packet header fields to comply with a second specified transmission communication protocol.

13. The network interface controller of claim 12, wherein configuring the metadata processing to generate the non-static packet header fields to comply with a second specified transmission communication protocol includes causing program instructions to be downloaded into a processor and configuring the processor to execute the program instructions to generate header fields complying with the second specified transmission communication protocol.

14. The network interface controller of claim 8, wherein receiving, from the host processor, an indication of a large data unit includes receiving, from the host processor, a pointer to a scatter/gather list pointing to at least the segment of the data unit.

15. One or more non-transitory computer-readable storage media storing computer-readable instructions that, when executed, instruct a processing unit of a network interface controller to perform operations comprising:

receiving, from a host processor, an indication of a data unit and an indication of a packet header template, the packet header template defining at least one or more static packet header fields of a packet header and one or more non-static packet header fields of the packet header;

generating metadata for transmitting a segment of the data unit over a network, wherein the metadata is not specific to a specified transmission communication protocol;

generating, at least partly using the metadata, the static packet header fields of the packet header;

generate, at least partly using the metadata and the static packet header fields, the non-static header fields that comply with the specified transmission communication protocol;

processing the packet header template, the static packet header fields and the non-static packet header fields to generate the packet header; and transmitting, over the network in accordance with the specified transmission communication protocol, a packet including the packet header and the segment of the data unit.

16. The one or more non-transitory computer-readable storage media of claim 15, wherein the metadata includes at least one of a payload size of the packet, a sequence number associated with the segment, or a data offset associated with the segment.

17. The one or more non-transitory computer-readable storage media of claim 15, wherein the metadata includes auxiliary data and the static packet header fields include the auxiliary data.

18. The one or more non-transitory computer-readable storage media of claim 15, wherein the specified transmission communication protocol includes one of Transmission Control Protocol (TCP) or Remote Direct Memory Access (RDMA).

19. The one or more non-transitory computer-readable storage media of claim 15, wherein the specified transmission communication protocol is a first specified transmission communication protocol, and the instructions further cause the metadata processing to generate non-static packet header fields to comply with a second specified transmission communication protocol.

20. The one or more non-transitory computer-readable storage media of claim 19, wherein configuring the metadata processing to generate header fields to comply with a second specified transmission communication protocol includes causing program instructions to be downloaded into a processor and configuring the processor to execute the program instructions to generate the non-static packet header fields complying with the second specified transmission communication protocol.

* * * * *